Nov. 7, 1933.  H. C. EDWARDS  1,933,618
INTERNAL COMBUSTION ENGINE
Filed Jan. 17, 1931  4 Sheets-Sheet 1

Inventor
HERBERT C. EDWARDS.

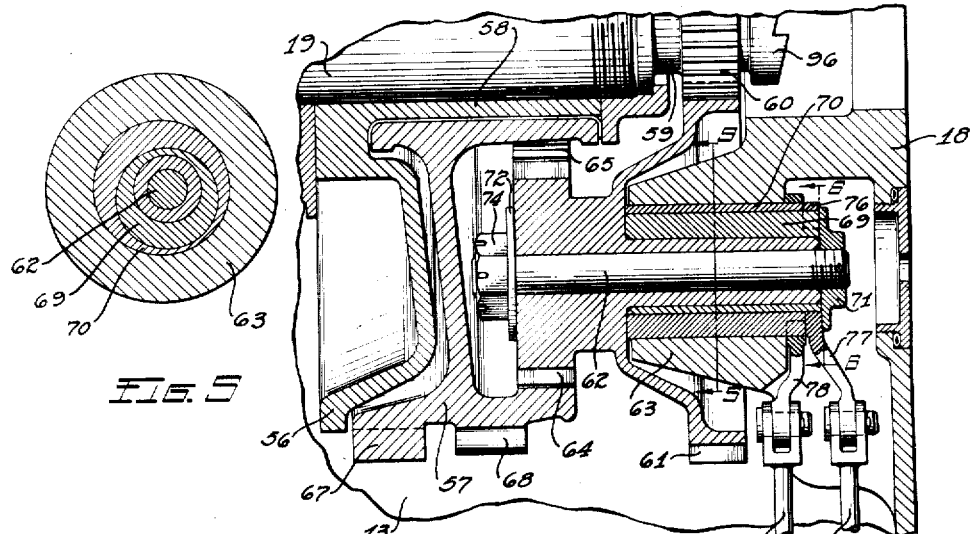
Fig. 5
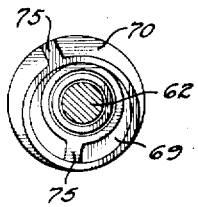
Fig. 3
Fig. 6
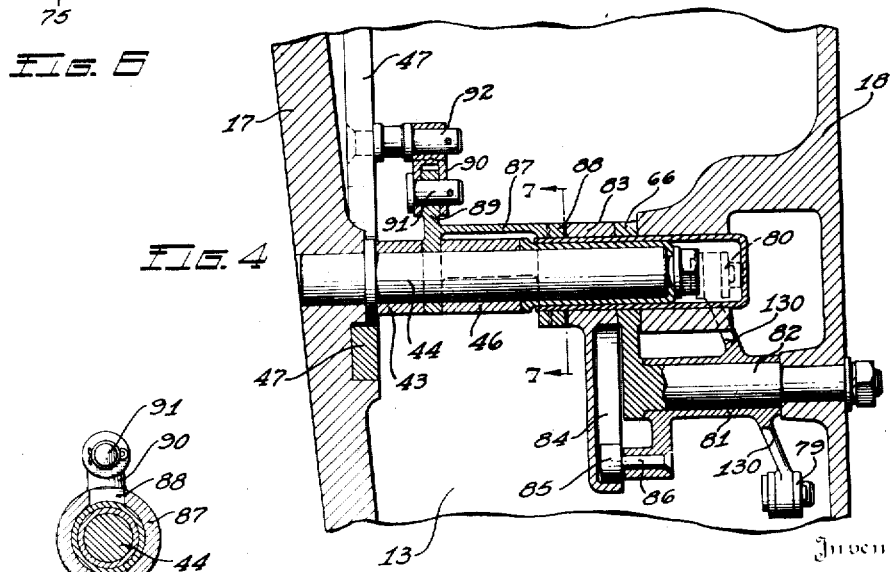
Fig. 4
Fig. 7
Inventor
HERBERT C. EDWARDS Nov. 7, 1933.     H. C. EDWARDS     1,933,618
INTERNAL COMBUSTION ENGINE
Filed Jan. 17, 1931     4 Sheets-Sheet 3

HERBERT C. EDWARDS.

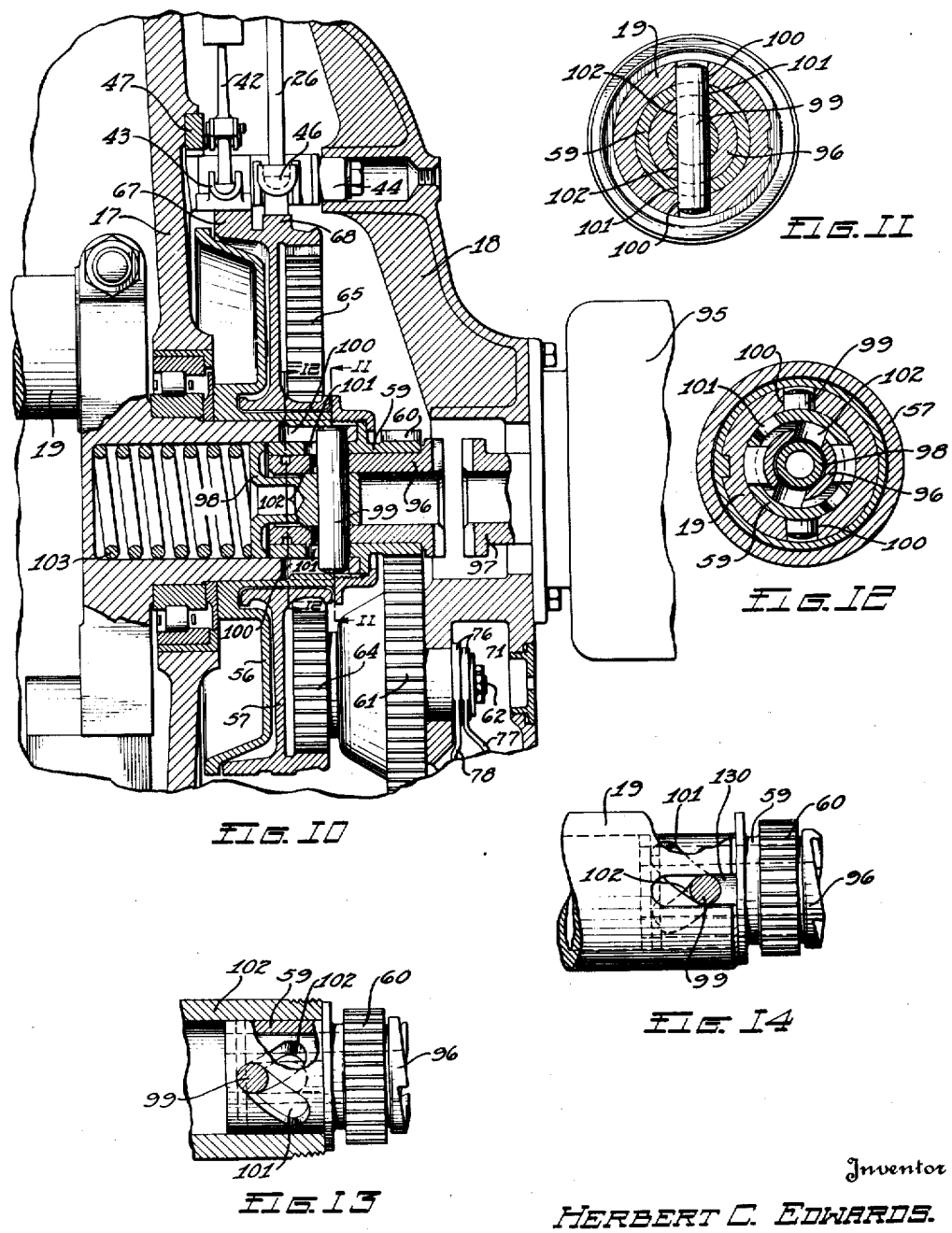

Patented Nov. 7, 1933

1,933,618

UNITED STATES PATENT OFFICE 1,933,618

INTERNAL COMBUSTION ENGINE

Herbert C. Edwards, Detroit, Mich., assignor to Packard Motor Car Company, Detroit, Mich., a corporation of Michigan Application January 17, 1931. Serial No. 509,322

10 Claims. (Cl. 123—139)

This invention relates to internal combustion engines, and more particularly to engines of the fuel injection type.

With engines of the compression-ignition type in which oil is injected into compressed air charges in the combustion chambers, it is important that the injection timing be varied in a definite relation with the volume variance of the oil charges if the best efficiency and combustion results are to be obtained. Ordinarily, with a single control, the oil injections are most advanced with maximum volume and are retarded as the volume is diminished, but under such circumstances the timing is usually too late to obtain the best combustion results with oil volume adjustment for normal running conditions, and too early to obtain the best combustion results with maximum oil volume and with oil volume adjustment for idling.

It is a general object of the present invention to provide a novel and improved form of fuel control for engines of the injection compression-ignition type.

Another object of my invention is to regulate the timing of fuel oil injections into compressed air charges in Diesel engines so that smoky exhaust is eliminated and good idling conditions result.

A further object of this invention is to provide an internal combustion engine with fuel injection mechanism which can be adjusted through a single control to introduce the extreme volumes of fuel oil into the combustion chambers at a later time than fuel charges of an intermediate volume.

Still another object of my invention is to provide fuel injection mechanism for engines, in which plungers are actuated by a cam driven from the engine, with a single control means for regulating the timing through changing the cam position angularly of the crank shaft in a predetermined relation with varying the effective stroke of the plungers to control the charge volume.

A further object of the invention is to provide timing control for the fuel charges of an injection type of engine in which drive gearing for actuating the push rods is shifted in a novel manner to regulate the position of the fuel pump actuating cam angularly relative to the crank shaft.

Still another object of the invention is to provide a radial internal combustion engine, having a plurality of fuel injection pumps actuated by a driven cam, with a rotatable ring control member for regulating the effective oil displacement stroke of the pumps and for regulating the angular relation of the cam to the crank shaft.

Other objects of the invention will appear from the following description taken in connection with the drawings, which form a part of this specification, and in which:

Fig. 3 is a fragmentary sectional view of the engine showing the reduction drive gearing for the cam and the mounting of the movable gear;

Fig. 4 is a fragmentary sectional view of the engine showing the control mechanism for regulating the position of the movable reduction gear;

Fig. 5 is a sectional view taken on line 5—5 of Fig. 3;

Fig. 6 is a sectional view taken on line 6—6 of Fig. 3, with the control links removed;

Fig. 7 is a sectional view taken on line 7—7 of Fig. 4;

Fig. 10 is a sectional view taken on line 10—10 of Fig. 1;

Fig. 11 is a sectional view taken on line 11—11 of Fig. 10;

Fig. 12 is a sectional view taken on line 12—12 of Fig. 10;

Fig. 13 is a fragmentary sectional view of the gear driving connection in position for starting;

Fig. 14 is another fragmentary sectional view of the same in regular running position.

Figure 1:
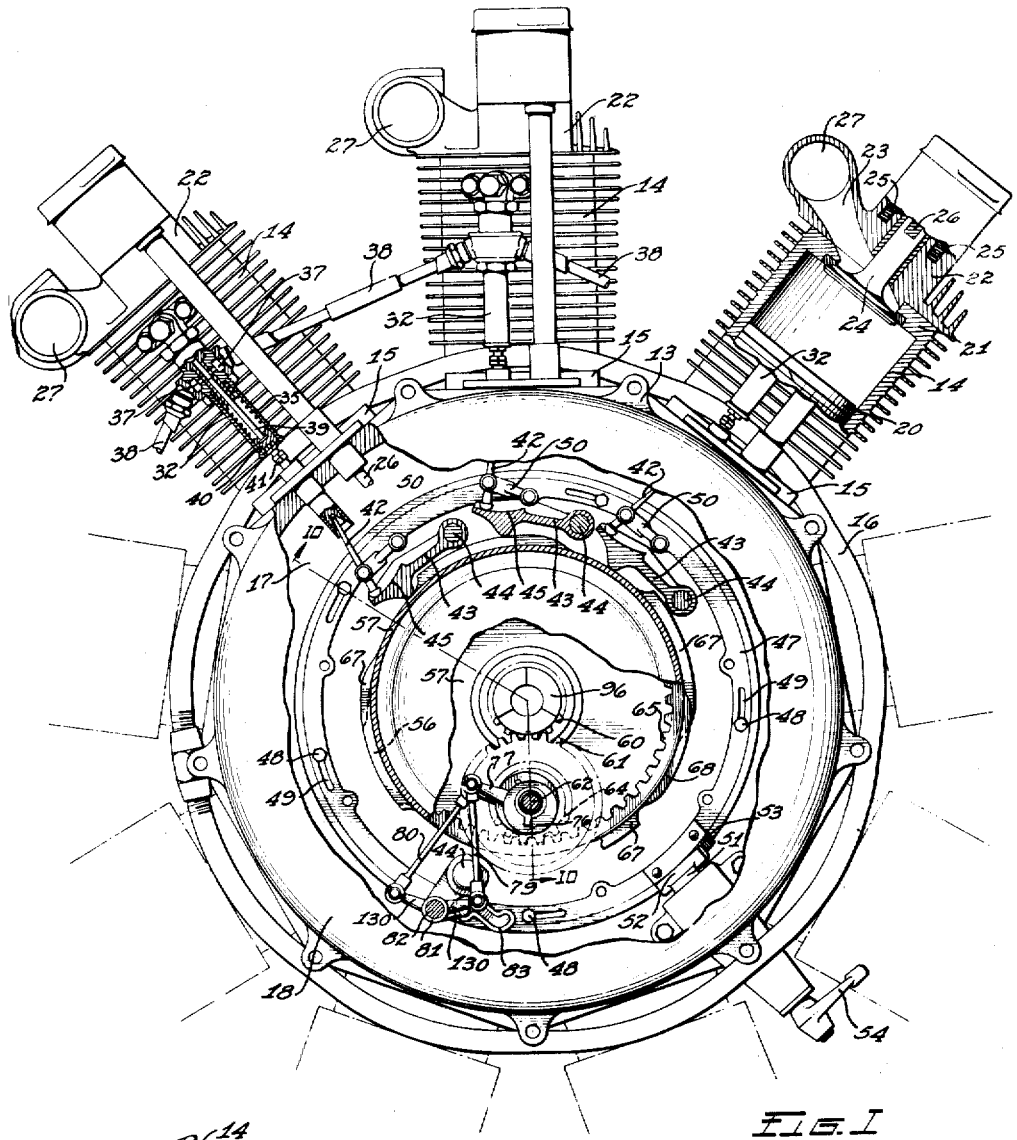
Fig. 1 is a rear elevation of an engine incorporating the invention, partly in section and partly broken away.
Figure 2:
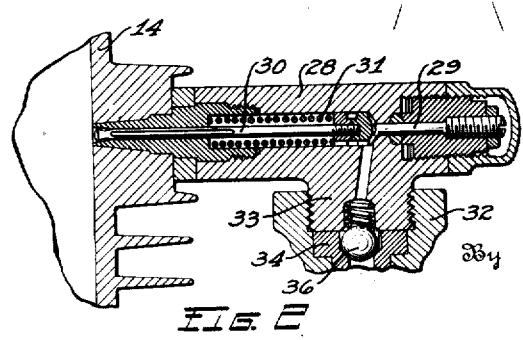
Fig. 2 is a section of the nozzle portion of one of the injection devices.
Figure 8:
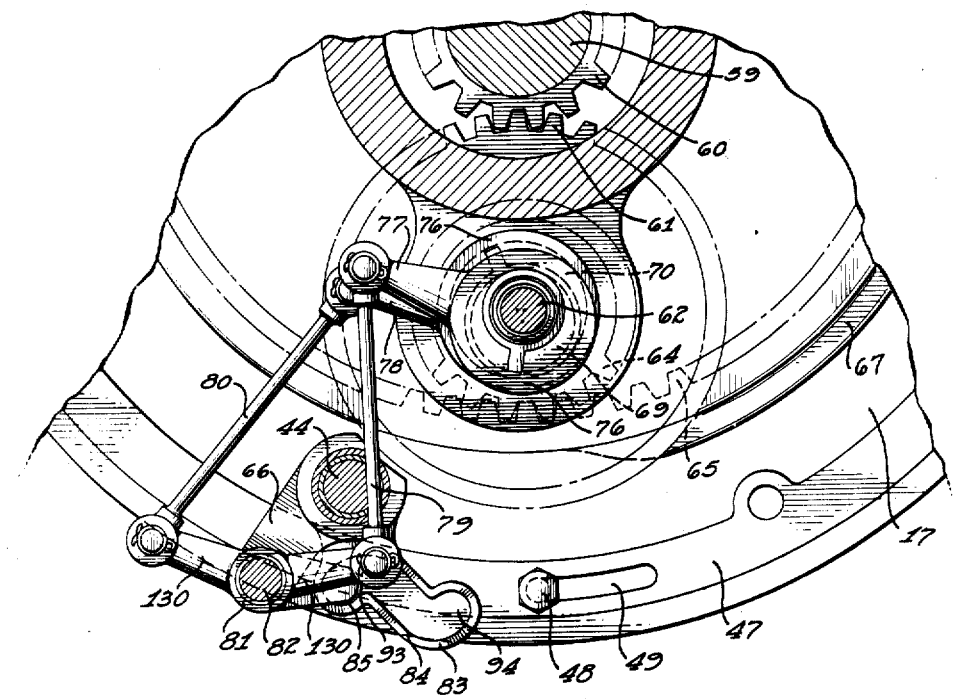
Fig. 8 is an elevational view of the control mechanism for regulating the fuel volume and timing.
Figure 9:
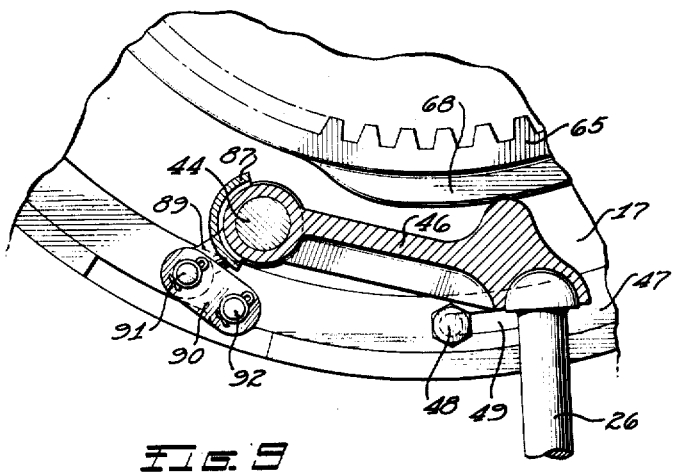
Fig. 9 is an elevational view, partly in section, showing the mounting of the air valve rocker lever and the connection of the gear shifting mechanism with the control ring.

Referring to the drawings by characters of reference, 13 represents the crank case of an internal combustion engine from which a plurality of cylinders 14 extend radially. The cylinders are each formed with oppositely disposed flanges 15 which are secured against the peripheral wall of the crank case by a pair of tension band means 16 which place the crank case in compression. Walls, one of which is indicated at 17, extend transversely of the crank case and reinforce the case interiorly, while the open rear end of the case is closed by the cover 18. Crank shaft 19 extends axially through the case and transverse walls, and is carried by suitable bearings.

Pistons, as indicated at 20, are connected in the usual manner with the crank shaft by a master rod assembly (not shown). The cylinders each include an integral head 21 and a superposed dome 22, and a single Venturi port 23 extends through each associated head and dome at an angle to the cylinder axis and tangentially of the inner wall of the cylinder, thus causing air charges drawn through the ports, during suction strokes of the pistons, to rotate spirally in the cylinders. A valve 24 controls the inner end of each port and is held closed during the compression and working strokes of the piston by springs 25 and is held open during the exhaust and suction strokes of the piston by the usual push rod and lever structure, a portion of which is indicated at 26. An open conduit 27 is arranged transversely of the outer end of each port and communicates therewith.

An individual injection device is associated with each of the cylinders for projecting atomized oil charges under high pressure into the compressed rotating air charges in cylinders. Each nozzle consists of a casing 28, bolted to the cylinder and having an axially extending chamber, a stop member 29, a valve 30 and a spring 31 exerting pressure against the valve member to urge it against the stop member. The stop member is adjusted so that the valve head will not quite engage the wall of the chamber. A pump casing 32 is screwed upon the neck 33 of each nozzle and carries a plunger barrel 34. A passage extends through the nozzle neck establishing communication between the barrel and the nozzle chamber, and a one-way valve 36 prevents back flow of oil from the nozzle to the barrel. Each barrel and its casing are provided with aligned openings 37 and a housing is secured around the inlet openings in each casing, the adjacent housings being connected by conduits 38 which with the housings constitute an oil supply manifold for the several injection devices. The manifold is connected with a reservoir and a low pressure pump (not shown) for moving oil into the pump barrels through the openings 37 when they are uncovered by the plunger 39 which reciprocates in each barrel and has an enlarged end 40 which is guided in the associated pump casing.

The plungers are reciprocated by springs 35 and an adjustable engine actuated mechanism. Such mechanisms each include an articulated push rod structure including a section 41, which engages the plunger head and extends through a guide into the crank case, a movable section 42 and a rock lever 43 which is pivoted upon a shaft 44 extending between the end cover and the adjacent wall 17. The free end of the rock levers is formed with a curved surface 45 upon which the rod sections 43 bear and are longitudinally adjustable thereon. A rock lever 46 is also mounted upon each of the shafts 44 and the push rods 26 of the valve opening mechanisms are each connected to the free end of one of such rock levers. When the openings 37 are uncovered by the plungers oil is moved from the manifold into the space in the barrels beyond the plungers, and when the plungers are moved so that they close the openings the oil is trapped and is displaced or projected from the nozzles in a volume depending upon the stroke of the plungers after closing of the ports. Adjustment of the stroke of the plungers will vary the volume of the oil charges delivered, or will not close the opening 37 in which event the engine will receive no fuel.

The stroke of the plungers is regulated by control mechanism which is manually actuated. A ring 47 is carried by the bolts 48 extending through slots 49 therein and fixed to the wall 17. A link 50 is pivoted to each of the push rod sections 42 and to the ring so that rotation of the ring will adjust the sections longitudinally of the curved faces of the associated rock levers. A shaft 51 extends through the crank case for rotating the ring and carries a gear segment 52 which meshes with the rack 53 on the ring. Suitable rod means (not shown) can be associated with the arm 54, fixed to the shaft, for rotating and maintaining the same in adjusted position at a point distant from the engine. When the ring 47 is moved to the position shown in Fig. 1, the push rods will be adjusted to engage the curved surface at the free end of the rock levers and in this relation the stroke of the push rods will move the plungers to their extreme position beyond the openings 37, thus delivering maximum oil charges when the rock levers 43 are lifted. As the push rods are adjusted toward the pivoted ends of the rock levers, the volume of the fuel charges delivered becomes less, and when the push rods are moved well toward the pivoted end of the rock levers the resulting piston stroke will not close the fuel inlet opening 37.

The fuel rock levers are moved in their effective fuel delivery strokes by a pair of cam means which are driven from the engine at relatively different speeds. One cam 56 which has a single lobe is fixed to the crank shaft, while the other cam 57 is rotatably mounted upon the extended hub portion 58 of the cam 56. A sleeve extension 59 is arranged to project from the rear end of the crank shaft and has a gear 60 formed thereon which meshes with an idler gear 61 carried by the stub shaft 62 mounted in the boss 63 on the rear cover. Another gear 64 is formed integral with the gear 61 and carried by the stub shaft in a relation to mesh with an internal gear 65 on the cam 57. Such gearing is of a reduction type and is arranged in this instance to rotate the cam 57 at one-eighth crank shaft speed and in a reverse direction relative thereto. The faster cam has a single lobe while the slower cam has four lobes 67, and the cams both rotate so that they will raise the fuel rock levers 43 as they pass thereby in their rotation. Due to the relative speed of the cams and the length of the lobes, only one of the cams is effective at a time to actuate the fuel rock levers because the lobe portion of the effective cam will hold the rock levers raised until the lobe portion of the other cam is under the same. The cam 57 is also provided with lobes 68 for actuating the rock levers 46 which operate the valve actuating mechanism.

In order to vary the timing of the fuel injections I provide a movable mounting for the idler gear shaft of the reduction gearing for rotating the slower cam, and shifting or control mechanism for this purpose is connected with and operated in a definite relation with the fuel control ring 47. A pair of telescoping eccentric bearing members 69 and 70 are mounted in the boss 63 and the gear hub through which the stub shaft extends is carried by the inner eccentric. The eccentrics are of different form and designed so that when rotated in opposite directions, the center of the gear hub carried thereby will be moved in an arc corresponding substantially to the circle of the internal cam gear 65, and therefore the gear 64 can be regulated partially around the cam 57 to control the position of the lobes thereon in their rotation relative to the lobe on the cam 56 and the crank shaft angle or the compression stroke of the pistons. The eccentricity of the telescoping bearing members 69 and 70 is different and of a character such that the pinion 64, supported by the inner bearing member, will follow a curved path substantially the same as the pitch radius of the gear 65, at least for the movement required in the adjustment of the timing range.

As before stated the eccentrics are regulated through mechanism connected to the fuel control ring 47. A nut 71 is screwed upon the rear end of the shaft 62 and a washer 72 is provided to engage the end of the gear 64. A nut 74 is screwed upon the front end of the shaft 62 and retains the eccentrics from axial displacement. The rear ends of the eccentrics are formed with tongues 75 which are engaged by yokes 76 on the arms 77 and 78, such arms having rods 79 and 80 pivotally connected therewith. The rods are also pivotally connected to a rocker member 81 having oppositely disposed integral arms 130 and rotatably mounted upon the stub shaft 82 which is carried by the rear crank case cover and fixed through the medium of an integral flange 66 through which one of the stub shafts 44 extends. Upon this same stub shaft is rotatably mounted a member 83 having a cam groove 84, formed in the side facing the shaft 81, for receiving a roller 85 which is carried by a pin 86 secured to the sleeve 81. A yoke 87 is rotatably mounted upon the shaft 44 which carries the cam groove member, and adjacent ends of the yoke and the cam member are formed with meshing driving lugs 88. At the front end of the yoke is an arm 89 to which a link 90 is pivoted by the pin 91 and the link is also pivotally mounted upon a pin 92 which is fixed to the fuel control ring 47.

When the control ring 47 is rotated in an anti-clockwise direction, looking at the rear of the engine, so that one end of the arcuate slots 49 is adjacent the bolts 48, as shown in the drawings, the push rods will be at their extreme position toward the free ends of the rock levers 43, and in this relation maximum volumes of oil are delivered into the cylinders by the fuel pumps. At the same time, the ring has moved the pin 92 so that the roller 85 is in the end 93 of the cam groove and with the cam member 83 in this relation the member 81 is moved so that it has rotated the eccentric members 69 and 70 into the positions shown in the drawings through means of the connecting links 79 and 80 and the arms 77 and 78. Under such circumstances the gear 64 is positioned so that it places the cam 57 in an angular position to the crank shaft, or in a relation with the compression stroke of the pistons, whereby its lobes will cause the fuel plungers to be actuated to close the ports 37 and cause the fuel injections to start at an intermediate time in the timing range, and in this instance, for example, at thirty-eight degrees before the pistons reach top center.

Movement of the ring 47 in a clockwise direction from that shown in the drawings will of course reduce the volume of the fuel charges, as it will move the push rods along the curved surfaces of the rock levers toward the pivoted ends thereof. Such movement of the ring will rock the cam 83 through the yoke 87 and the link 90 causing the roller to ride toward the end 94 of the cam groove which will rotate the eccentrics to move the gear 64 relative to the cam 57 and thus advance the time at which the lobes 67 engage the rock levers. With the form of cam groove illustrated, the timing is advanced as the fuel volume of the charges is decreased from a maximum to approximately sixty per cent delivery, and likewise, the timing will be retarded as the fuel charge volume is increased beyond sixty per cent delivery.

Further reduction of the fuel charge volume from sixty per cent delivery through clockwise adjustment of the ring 47 will cause the cam member 83 to rotate so that the roller continues to ride toward the end 94 of the groove and such movement rocks the member 81 so that the links 79 and 80 and the arms 77 and 78 rotate the eccentrics to change the position of the gear 64 so that the time at which the lobes 67 actuate the plungers effectively is gradually retarded until the roller 85 reaches the extreme end 94 of the cam groove, and in this relation the pump plunger movement will not close the ports 37.

It will be seen that the timing of the fuel delivery is such that it is most advanced with a sixty per cent volume, and that it is retarded as the volume is increased or diminished from the sixty per cent volume. The engine illustrated is designed more particularly for propelling aeroplanes, and as sixty per cent fuel delivery is the quantity employed for normal flying operation I have selected these conditions for forming the cam groove as shown. It will also be seen that the timing is retarded much more for idling than for maximum fuel volume, and the timing for idling is approximately sixteen degrees before the pistons reach top center on their compression strokes. The timing mechanism which shifts the position of the gear around the cam gear is actuated automatically in a definite relation with the fuel charge volume adjustment and through manipulation of a single control which is manually operated.

With the timing advanced for fuel charges adequate to cause normal running of the engine, the early injection provides adequate time for a thorough commingling of the oil with the compressed air prior to the time that the pistons reach top center in the cylinders and, consequently, the mixture of the air and the oil will be such that complete combustion will take place, thus obtaining the greatest efficiency and eliminating any smoke in the exhaust caused by unburned fuel. With the retarded injection for oil charges which produce idling of the engine, the late injection is of an advantage and is beneficial to the engine efficiency because at the time of injection the air will be compressed more than it is under running conditions and consequently there will be greater heat developed in the combustion chambers into which the oil is injected, such heat assisting the combustion under such circumstances. Through providing for a delayed timing for maximum fuel injections relative to injections for normal running, higher air temperature development is attained which assists the commingling, and lower peak pressure results so that wear on the pistons and rings is reduced. It will thus be seen that I have provided for automatically regulating the timing of the fuel injections in a predetermined relation to the volume of the charges so that the greatest engine efficiency will result within the range of the fuel adjustment.

The invention, above described, is shown associated with an engine in which an inertia starter, indicated generally at 95, is employed to retard the timing of the fuel injections when applied to the crank shaft through the operation of mechanism which I will now describe. It will be understood that the ring 47 is adjusted so that the plungers will cause maximum fuel charges to be injected during application of the starter and that the late timing caused by the application of the starter is not interfered with in any way by the timing mechanism above described. The sleeve 59 projects into the rear end of the crank shaft 19, and extending interiorly of such sleeve is a starter jaw 96 with which the jaw 97 of the starter is adapted to engage to rotate the crank shaft. The starter can be of a conventional inertia type now employed with aeroplane engines. A piston 98 projects into the front end of the jaw member 96 and a pin 99 extends through such piston and engages in axially extending slots 100 formed in the rear end portion of the crank shaft. The sleeve 59 is provided with oppositely disposed slots 101 which extend angularly relative to the axis and in an opposite direction to that in which the oppositely disposed slots 102 in the starter jaw extend. The pin 99 extends through the slots 101 and 102, and the piston 98 is urged rearwardly of the engine through means of a coil spring 103 disposed within the hollow end of the crank shaft. This spring normally maintains the pin 99 in its rearmost position in the slots 100, 101 and 102 as shown in Figs. 10 and 14, which relation is maintained when the starter jaw 97 is disengaged from driving relation with the jaw 96.

In starting the engine the inertia starter is energized and the jaw 97 is moved into engagement with the jaw 96. The initial rotation of the jaw 96 by the inertia starter will cause the pin 99 to move forwardly in the angular slots 102 and in the slots 101 and 100. This forward movement will not effect rotation of the crank shaft until the pin has reached the rear end of the slots 102 and 101, whereupon the crank shaft will be rotated through the pin which is rotated by the jaw 96. This forward movement of the pin in the angular slots 101 will cause rotation of the sleeve 59 and the gear 60 so that the reduction gearing for rotating the cam 57 will be rotated and the cam itself will be rotated relative to the cam 56 and to the crank shaft so that the lobes 67 are arranged to rotate in a timed relation behind the lobe on the cam 56 to actuate the fuel rock levers 43. With the cam 57 moved in a direction so that the lobes 67 will pass under the rock levers after they have been raised by the single lobe cam, the fuel injections will take place just shortly before the pistons reach their top center position during the compression strokes because the single lobe cam is fixed to the crank shaft in this relation. The single lobe cam operating at crank shaft speed will impart a much faster movement to the rock levers when starting the engine than would be imparted by the cam 57 under rotation at starting, and therefore the starting cam 56 will cause the maximum fuel charges to be injected under a high pressure across the air charges rotating in the cylinder so that a proper commingling and atomization will result. After the engine has been turned over once or twice by the starter, it will become self-igniting and the crank shaft and connected jaw 96 will overrun the jaw 97 whereupon the rotation of the jaw 97 will cease and the jaw will be moved rearwardly. The spring 103 will move the pin rearwardly when the starter is out of driving relation and will thus return the sleeve 59 to the position shown in Fig. 10. The position of the pin and the sleeve 59 when in their forward position with the single lobe cam in effective relation is shown in Fig. 13. The cam 57 runs at one-eighth crank shaft speed while the cam 56 runs at crank shaft speed and the cams rotate relatively in opposite directions. There are four lobes on the cam 57 and a single lobe on the cam 56, and all of such lobes are of sufficient length so that when the cam 57 is effective it will hold the rock levers in a raised position until the lobe on the cam 56 passes thereunder, and likewise, the lobe on the cam 56 when effective will hold the rock levers raised until the lobes on the cam 57 pass thereunder sufficiently so that they will not actuate the same.

It will be seen that when starting the engine a full fuel charge delivery can be made with a very late timing through the application of the starter to the jaw 96, and this manner of injecting the fuel is not interfered with nor does it interfere with the fuel volume regulation and its timing mechanism which is employed when the engine is running under its own power.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In an internal combustion engine of the Diesel type, adjustable pressure devices associated with the cylinders to inject fuel charges therein, means connected with said devices for regulating the quantity of fuel in the charges delivered, engine driven mechanism including gearing for actuating gears in said devices in desired sequence, means for adjusting the relation of said gearing to regulate the time at which the devices are actuated in the engine cycle, and a single control means connected to actuate the adjusting means and the regulating means in a definite relation.

2. In an internal combustion engine of the Diesel type, an adjustable pressure device associated with each cylinder to inject fuel charges therein, mechanism connected to adjust said devices for regulating the quantity of fuel in the charges delivered, engine driven mechanism including gearing for actuating said devices in desired sequence, means for shifting the position of a portion of said gearing to regulate the time at which the devices are actuated, and a single control means connected to actuate the adjusting mechanism and the gear shifting means.

3. In a radial internal combustion engine of the Diesel type, an adjustable pressure device associated with each cylinder for injecting fuel therein, a rotatable ring connected with said devices for regulating the volume of the delivered charges, means for actuating the ring, a cam associated to actuate said devices, engine driven mechanism for rotating said cam, said driven mechanism being adjustably related to change the timing of the cam, and a connector between the ring and the driven mechanism, said connector adjusting the driven mechanism to vary the timing of the actuation of the devices when the ring is rotated.

4. In a radial internal combustion engine of the

Diesel type, an adjustable pressure device associated with each cylinder for injecting fuel charges therein, a rotatable ring connected to adjust said devices and regulate the volume of the fuel charges injected thereby, means for rotating the ring, engine driven mechanism for actuating said devices including adjustably related gearing, and connecting mechanism including a cam member between the ring and the gearing, the adjustment of said ring shifting the relation of the gearing to vary the timing.

5. In a radial internal combustion engine of the Diesel type, an adjustable pressure device associated with each cylinder for injecting fuel charges therein, a ring connected to adjust said devices when rotated, means operable to rotate said ring, a cam for engaging said devices to cause injection strokes thereof, engine driven gearing associated to rotate said cam, one of said gears having a shiftable mounting to change the relation thereof with an associated gear, and connection means between said shiftable gear mounting and the ring, the rotation of said ring actuating the connection means to shift the gear mounting to retard the cam actuation timing above a predetermined fuel charge volume and to retard the same below the predetermined fuel charge volume.

6. In a mechanism for actuating fuel injection devices, gearing, an adjustable mounting for one of the gears in the gearing comprising a pair of eccentric members, and manually operable mechanism for shifting the relation of said eccentric members to move the gear carried thereby with respect to another gear in the gearing to change the timing of the fuel injections.

7. In a mechanism for actuating fuel injection devices, two meshing gears, a mounting for one of said gears comprising a pair of telescoping eccentrics, and mechanism for shifting said eccentrics in opposite directions, the shifting of said eccentrics moving the gear carried thereby with respect to another gear in the gearing to vary the timing of the device actuation.

8. In a mechanism for actuating fuel injection devices, meshing gears, a mounting for one of said gears including a stationary shaft and a pair of telescoping eccentrics mounted on the shaft, a rocker member mounted adjacent said eccentrics, a pair of arms extending from the rocker member, a link connection between each eccentric and an arm, and means for oscillating said rocker member, movement of the rocker member actuating the arms and links to rotate eccentrics in opposite directions to shift the gear carried thereby in relation to another gear with which it meshes.

9. In an internal combustion engine of the compression-ignition type, an adjustable pressure device associated with each cylinder for injecting variable fuel charges therein, a rotatable ring connected to adjust said devices and regulate the volume of the fuel charges injected thereby, movement of the ring in one direction increasing the fuel volume injected by the devices and movement of the ring in the other direction decreasing the fuel volume injected by the devices, means for rotating the ring, engine driven mechanism for actuating said devices including a cam, said mechanism being adjustable to vary the cam timing and connecting mechanism between the engine driven mechanism and the ring, said connecting mechanism being actuated simultaneously with the ring to adjust said engine driven mechanism and including cam means associated to retard the timing when the ring is moved in either direction from an intermediate position in its range of adjustment and to advance the timing when the ring is moved in either direction toward the intermediate position in its range of adjustment.

10. In an internal combustion engine, driving mechanism for a fuel injection device actuating cam comprising gearing, an eccentric mounting for one of the gears in the gearing, a rocker lever connected to shift the eccentric mounting, a cam member connected to control the rocker lever, and manually operable mechanism for rocking the cam member.

HERBERT C. EDWARDS.

CERTIFICATE OF CORRECTION.

Patent No. 1,933,618.  November 7, 1933.

HERBERT C. EDWARDS.

It is hereby certified that error appears in the printed specification of the above numbered patent requiring correction as follows: Page 4, line 117, claim 1, strike out the words "gears in" and insert the same before "said" in line 118, of same claim; and that the said Letters Patent should be read with this correction therein that the same may conform to the record of the case in the Patent Office.

Signed and sealed this 19th day of December, A. D. 1933.

Richard Spencer

Acting Commissioner of Patents.

(Seal)

Diesel type, an adjustable pressure device associated with each cylinder for injecting fuel charges therein, a rotatable ring connected to adjust said devices and regulate the volume of the fuel charges injected thereby, means for rotating the ring, engine driven mechanism for actuating said devices including adjustably related gearing, and connecting mechanism including a cam member between the ring and the gearing, the adjustment of said ring shifting the relation of the gearing to vary the timing.

5. In a radial internal combustion engine of the Diesel type, an adjustable pressure device associated with each cylinder for injecting fuel charges therein, a ring connected to adjust said devices when rotated, means operable to rotate said ring, a cam for engaging said devices to cause injection strokes thereof, engine driven gearing associated to rotate said cam, one of said gears having a shiftable mounting to change the relation thereof with an associated gear, and connection means between said shiftable gear mounting and the ring, the rotation of said ring actuating the connection means to shift the gear mounting to retard the cam actuation timing above a predetermined fuel charge volume and to retard the same below the predetermined fuel charge volume.

6. In a mechanism for actuating fuel injection devices, gearing, an adjustable mounting for one of the gears in the gearing comprising a pair of eccentric members, and manually operable mechanism for shifting the relation of said eccentric members to move the gear carried thereby with respect to another gear in the gearing to change the timing of the fuel injections.

7. In a mechanism for actuating fuel injection devices, two meshing gears, a mounting for one of said gears comprising a pair of telescoping eccentrics, and mechanism for shifting said eccentrics in opposite directions, the shifting of said eccentrics moving the gear carried thereby with respect to another gear in the gearing to vary the timing of the device actuation.

8. In a mechanism for actuating fuel injection devices, meshing gears, a mounting for one of said gears including a stationary shaft and a pair of telescoping eccentrics mounted on the shaft, a rocker member mounted adjacent said eccentrics, a pair of arms extending from the rocker member, a link connection between each eccentric and an arm, and means for oscillating said rocker member, movement of the rocker member actuating the arms and links to rotate eccentrics in opposite directions to shift the gear carried thereby in relation to another gear with which it meshes.

9. In an internal combustion engine of the compression-ignition type, an adjustable pressure device associated with each cylinder for injecting variable fuel charges therein, a rotatable ring connected to adjust said devices and regulate the volume of the fuel charges injected thereby, movement of the ring in one direction increasing the fuel volume injected by the devices and movement of the ring in the other direction decreasing the fuel volume injected by the devices, means for rotating the ring, engine driven mechanism for actuating said devices including a cam, said mechanism being adjustable to vary the cam timing and connecting mechanism between the engine driven mechanism and the ring, said connecting mechanism being actuated simultaneously with the ring to adjust said engine driven mechanism and including cam means associated to retard the timing when the ring is moved in either direction from an intermediate position in its range of adjustment and to advance the timing when the ring is moved in either direction toward the intermediate position in its range of adjustment.

10. In an internal combustion engine, driving mechanism for a fuel injection device actuating cam comprising gearing, an eccentric mounting for one of the gears in the gearing, a rocker lever connected to shift the eccentric mounting, a cam member connected to control the rocker lever, and manually operable mechanism for rocking the cam member.

HERBERT C. EDWARDS.

CERTIFICATE OF CORRECTION.

Patent No. 1,933,618.  November 7, 1933.

HERBERT C. EDWARDS.

It is hereby certified that error appears in the printed specification of the above numbered patent requiring correction as follows: Page 4, line 117, claim 1, strike out the words "gears in" and insert the same before "said" in line 118, of same claim; and that the said Letters Patent should be read with this correction therein that the same may conform to the record of the case in the Patent Office.

Signed and sealed this 19th day of December, A. D. 1933.

Richard Spencer

Acting Commissioner of Patents.

(Seal)

CERTIFICATE OF CORRECTION.

Patent No. 1,933,618.  November 7, 1933.

HERBERT C. EDWARDS.

It is hereby certified that error appears in the printed specification of the above numbered patent requiring correction as follows: Page 4, line 117, claim 1, strike out the words "gears in" and insert the same before "said" in line 118, of same claim; and that the said Letters Patent should be read with this correction therein that the same may conform to the record of the case in the Patent Office.

Signed and sealed this 19th day of December, A. D. 1933.

Richard Spencer (Seal) Acting Commissioner of Patents.